(No Model.)  2 Sheets—Sheet 2.
H. REYNOLDS.
WINDMILL.
No. 368,782. Patented Aug. 23, 1887.
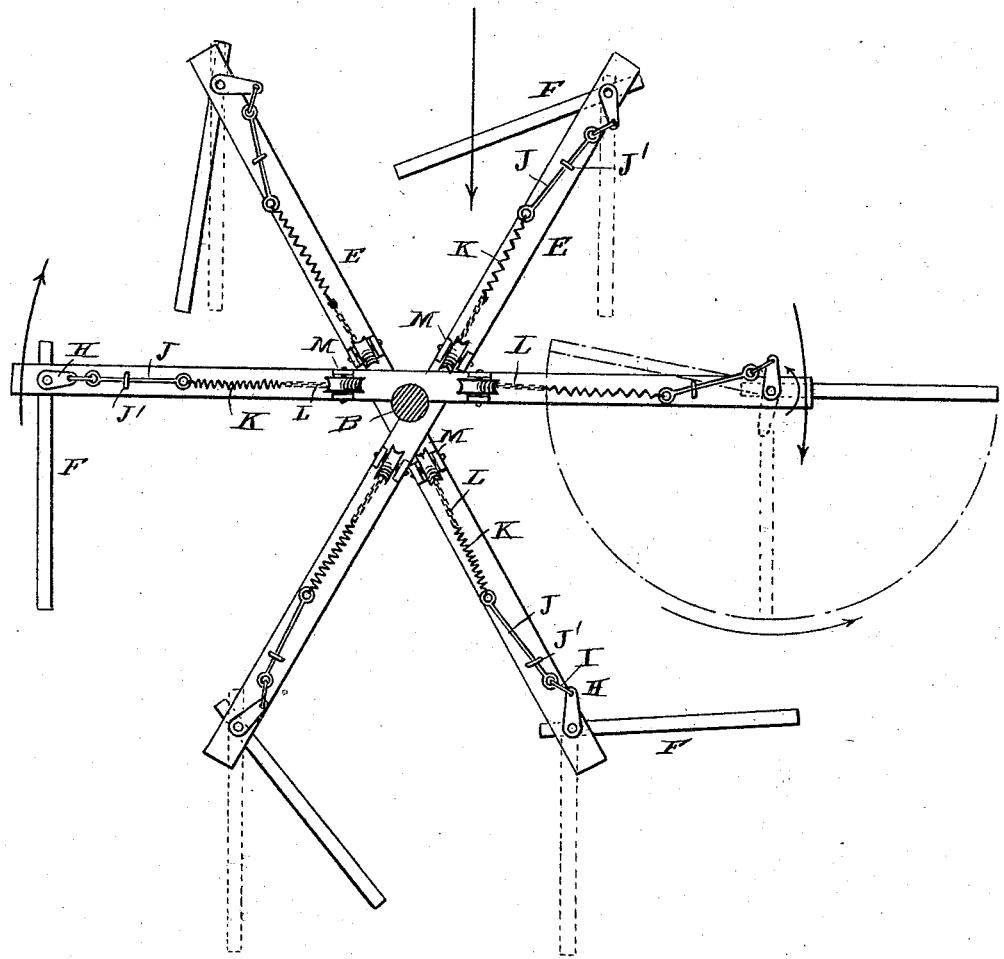
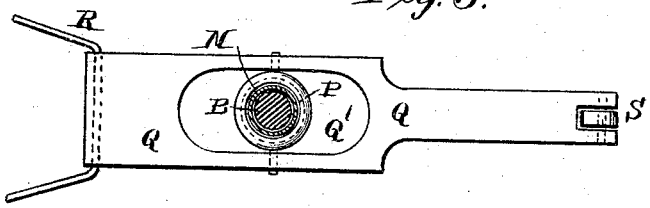
WITNESSES:
INVENTOR:
H. Reynolds
BY Munn & Co.
ATTORNEYS.

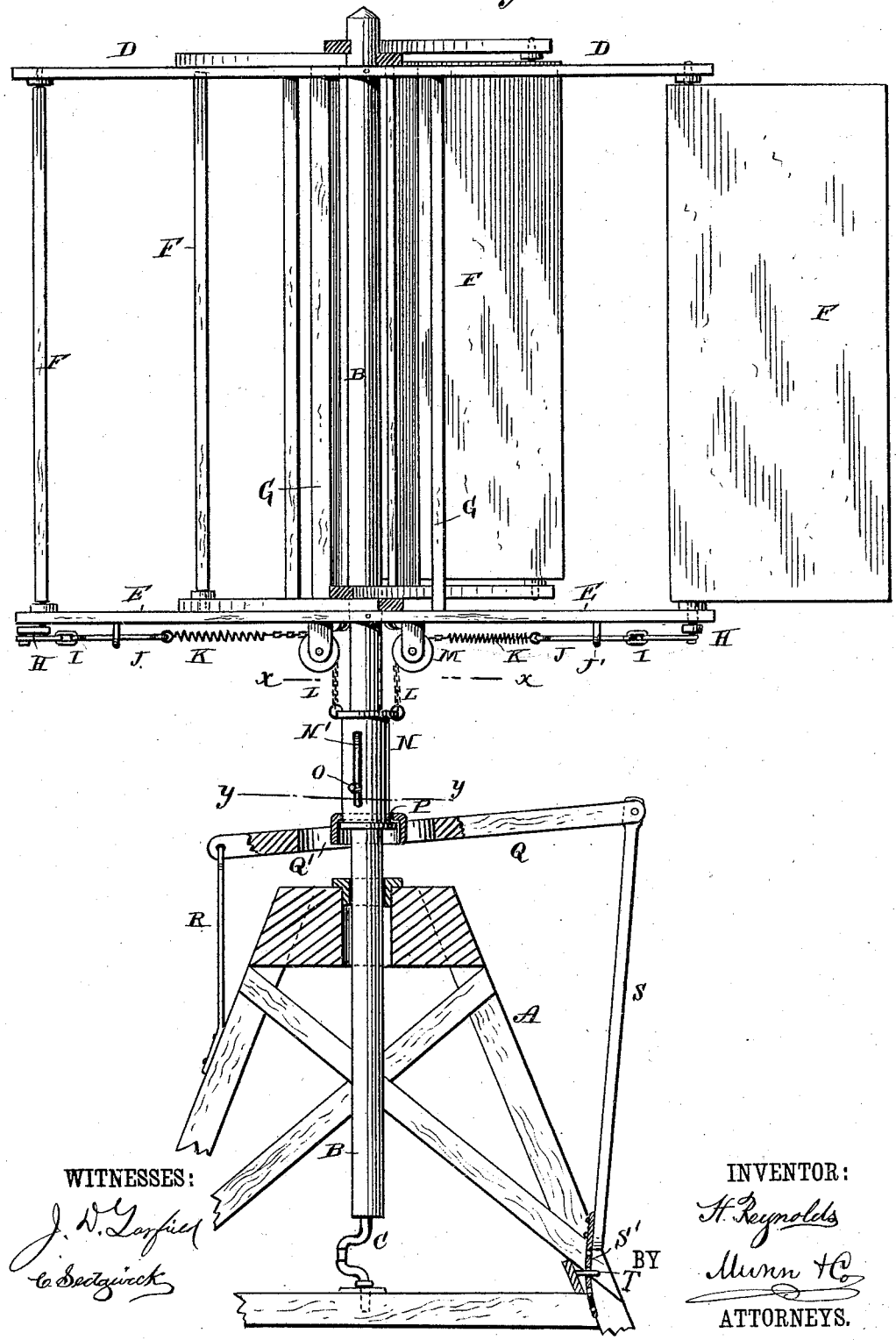

UNITED STATES PATENT OFFICE.

HANFORD REYNOLDS, OF GIFFORD, ILLINOIS.

WINDMILL.

SPECIFICATION forming part of Letters Patent No. 368,782, dated August 23, 1887.

Application filed April 13, 1887. Serial No. 234,602. (No model.)

*To all whom it may concern:*

Be it known that I, HANFORD REYNOLDS, of Gifford, in the county of Champaign and State of Illinois, have invented a new and Improved Windmill, of which the following is a full, clear, and exact description.

My invention has for its object to provide an improved windmill so constructed and arranged that its wings can be automatically adjusted in accordance with the force and direction of the wind, and by the same present resisting-surfaces on one side of the mill and their edges on the other side thereof; can, further, be adjusted in accordance with the power required, and can be readily thrown in or out of action.

The invention consists in certain novel features of construction and combinations of parts, as hereinafter fully described, and particularly set forth in the claims.

Reference is to be had to the accompanying drawings, forming a part of this specification, in which similar letters of reference indicate corresponding parts in all the figures.

Figure 1 is a side, partly sectional, elevation representing my improved windmill in action. Fig. 2 is an inverted sectional view on the line x x, Fig. 1. Fig. 3 is a sectional plan view on the line y y, Fig. 1.

A designates the tower of the windmill, B a vertical shaft journaled in suitable bearings in the top and bottom of the tower A, and C a crank on the lower part of the shaft for connection with a pump or other device or machine to be worked by the mill.

D designates horizontal arms, of equal length, fixed to and radiating from the upper end of the shaft B, and E similar and correspondingly-arranged horizontal arms radiating from the shaft B at a distance from the upper arms about equal to the vertical length of the wings F.

Vertical braces G connect each pair of upper and lower arms, D E, at a distance from their ends a little greater than the width of the wings F, and said wings are pivoted at the top and bottom, near one side, to the outer ends of the upper and lower arms, D E, of the rotary frame thus constituted. The lower pivots of the wings are fixed thereto, pass through and turn freely in the arms E, and are provided therebelow with cranks H, arranged at an angle of about ninety degrees with their respective wings F. Each crank H is connected by a short chain, I, with one eye of a long link, J, having twice the length of the crank H, the eye on the other end of which link is connected by a coiled spring, K, with a chain, L, passed over a sheave, M, pivoted on the under side of the corresponding arm, E, at its inner end. The several chains L then run down at the side of the main shaft B, and are secured to suitable eyes on an annular rim formed on the upper end of a thimble, N, mounted to slide vertically on the shaft B.

The thimble N is guided on and compelled to turn with the shaft by a pin, O, on the same projecting through a vertical slot, N', in the thimble.

The links J, interposed in the connections of the cranks H and thimble N, ride lengthwise in keepers J', attached to the under sides of the arms E, and adapted to engage the eyes at either end of the links J, the eyes thus acting as stops to limit the movement of the links, and hence the entire connections in either direction. The thimble N is also connected by a swivel-joint with a lower thimble, P, pivoted to rock in a slot, Q', formed in the controlling-lever Q.

The lever Q is pivotally connected at one end to the tower A by a forked brace, R, secured to the same, and at the other end it is pivoted to a hanging adjusting-bar, S.

The adjusting-bar S is provided with an extension, S', having a vertical series of apertures adapted to engage a pin, T, projecting from the base of the tower A, near the bottom thereof. When the mill is thrown out of action, the adjusting-bar S is disconnected from its pin or catch T, thus loosening the connections of the cranks and the controlling-lever Q and allowing the wings to swing freely from and with the wind, as in dotted lines in Fig. 2. When the mill is to be thrown in action, the adjusting-bar S is drawn down and caught, thus tightening the connections of the controlling-lever and cranks H, and tending to hold the several wings at right angles with their respective arms D E. The wind being in the direction indicated by the straight arrow in Fig. 2, the wings F take the positions indicated in full lines in said figure—that is, the wing at the extreme left maintains its position in which it is held by the yielding connections with and from the wind, which thus has no effect thereon. The wing at the right, on the other hand, is swung rearward by the wind and outward by the spring K into a position approximately in line with its supporting-arms D E, and thus faces the wind. The intermediate wings assume positions which are the resultant of the tendency of their yielding connections to hold them at a right angle with their respective supporting-arms D E and of the pressure of the wind on their faces. In all these positions, except that of the wing or wings on the extreme left, which are inactive, as stated, the resultant effect of the wind on the more or less inclined wings is to rotate the wing-carrying frame, and thus the main shaft, in the direction indicated by the curved arrows, as clearly seen on inspection of Fig. 2.

By properly adjusting the controlling-lever Q the tension of the springs K may be increased or decreased, as desired, compelling the wings to face (more or less) the wind, so that accurate allowance may be made for the power required.

The mill is self-compensating, in that the wings face the wind more squarely as the force of the same decreases, and vice versa, so that the speed is maintained constant, while the force of the wind varies. The mill requires no vane or other device for adjusting it in accordance with the direction of the wind, as from the fact that its wings are governed by the wind it is seft-adjusting and works equally well with all directions of the same.

Having thus described my invention, what I claim as new, and desire to secure by Letters Patent, is—

1. In a windmill, the combination, with a vertical shaft and a frame mounted thereon, of wings pivoted in the said frame and provided with crank-arms, a sliding thimble on the said shaft, yielding connections between the crank-arms and thimble, and means for operating the said thimble, substantially as herein shown and described.

2. In a windmill, the combination, with a vertical shaft and a frame mounted thereon, of wings pivoted between the arms of the frame and provided with crank-arms on their lower ends, a sliding thimble on the said shaft, yielding connections between the crank-arms and sliding thimble, and a pivoted lever connected by a swiveled joint with the said thimble, substantially as herein shown and described.

3. In a windmill, the combination, with a vertical shaft, a frame mounted thereon, and wings pivoted between the arms of the said frame and provided with crank-arms H, of the thimble N, mounted loosely on the said shaft, the yielding connection J K L between the crank-arms and thimble, the slotted lever Q, the thimble P, pivoted in the slot of the lever Q and engaging the thimble N, and the adjusting-bar S, substantially as herein shown and described.

HANFORD REYNOLDS.

Witnesses:
JOHN W. H. REMLEY,
JOHN P. DAY.